United States Patent
Miklos et al.

(10) Patent No.: US 10,255,264 B2
(45) Date of Patent: *Apr. 9, 2019

(54) GENERATING AND APPLYING OUTGOING COMMUNICATION TEMPLATES

(71) Applicant: Google LLC, Mountain View, CA (US)

(72) Inventors: Balint Miklos, Zurich (CH); Julia Proskurnia, Lausanne (CH); Luis Garcia Pueyo, San Jose, CA (US); Marc-Allen Cartright, Stanford, CA (US); Tobias Kaufmann, Zurich (CH); Ivo Krka, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/902,094

(22) Filed: Feb. 22, 2018

(65) Prior Publication Data

US 2018/0181557 A1 Jun. 28, 2018

Related U.S. Application Data

(63) Continuation of application No. 14/986,644, filed on Jan. 1, 2016.

(51) Int. Cl.
*G06F 17/24* (2006.01)
*G06F 17/27* (2006.01)
*G06F 17/30* (2006.01)

(52) U.S. Cl.
CPC .......... *G06F 17/248* (2013.01); *G06F 17/243* (2013.01); *G06F 17/2735* (2013.01); *G06F 17/30958* (2013.01)

(58) Field of Classification Search
CPC .............................. G06F 17/243; G06F 17/248
See application file for complete search history.

(56) References Cited

U.S. PATENT DOCUMENTS

| 7,225,232 B2 | 5/2007 | Elberse |
| 7,496,500 B2 * | 2/2009 | Reed .................... G06Q 10/107 704/270 |

(Continued)

OTHER PUBLICATIONS

Marom, Y., Zukerman, I., & Japkowicz, N. (Jul. 2007). A meta-learning approach for selecting between response automation strategies in a help-desk domain.

(Continued)

*Primary Examiner* — Scott T Baderman
*Assistant Examiner* — Mario M Velez-Lopez
(74) *Attorney, Agent, or Firm* — Middleton Reutlinger

(57) ABSTRACT

Methods, apparatus, systems, and computer-readable media are provided for generating and applying outgoing communication templates. In various implementations a corpus of outgoing communications sent by a user may be grouped into a plurality of clusters based on one or more attributes of a context of the user. One or more segments of each outgoing communication of a particular cluster may be classified as fixed in response to a determination that a count of occurrences of the one or more segments across the particular cluster satisfies a criterion. One or more remaining segments of each communication of the particular cluster may or may not be classified as transient. Based on sequences of classified segments associated with each communication of the particular cluster, an outgoing communication template may be generated to automatically populate at least a portion of a draft outgoing communication being prepared by the user.

11 Claims, 7 Drawing Sheets

(56) References Cited

U.S. PATENT DOCUMENTS

| | | | |
|---|---|---|---|
| 7,512,605 B2 * | 3/2009 | Spangler | G06F 17/3071 |
| 7,660,804 B2 * | 2/2010 | Wen | G06F 17/2241 |
| | | | 707/999.1 |
| 8,103,726 B2 | 1/2012 | Stoddard et al. | |
| 8,364,467 B1 * | 1/2013 | Bowman | G06F 17/2765 |
| | | | 704/1 |
| 8,583,648 B1 * | 11/2013 | Majkowska | G06F 17/30011 |
| | | | 707/737 |
| 9,563,689 B1 * | 2/2017 | Pueyo | G06F 17/30705 |
| 2004/0249637 A1 * | 12/2004 | Baker | G10L 15/1822 |
| | | | 704/239 |
| 2004/0260756 A1 * | 12/2004 | Forstall | H04L 51/00 |
| | | | 709/200 |
| 2006/0168006 A1 * | 7/2006 | Shannon | G06Q 10/107 |
| | | | 709/206 |
| 2008/0222256 A1 | 9/2008 | Rosenberg et al. | |
| 2008/0313283 A1 | 12/2008 | Cohen et al. | |
| 2010/0100815 A1 * | 4/2010 | Hutchinson | G06F 17/2229 |
| | | | 715/256 |
| 2010/0325115 A1 * | 12/2010 | Xu | G06F 17/245 |
| | | | 707/749 |
| 2013/0138655 A1 * | 5/2013 | Yan | G06F 17/30702 |
| | | | 707/738 |
| 2014/0032485 A1 * | 1/2014 | Perelman | G06F 17/243 |
| | | | 707/608 |
| 2014/0351028 A1 * | 11/2014 | Killoh | G06Q 30/0276 |
| | | | 705/14.4 |
| 2015/0058428 A1 | 2/2015 | Caskey et al. | |
| 2015/0100943 A1 | 4/2015 | Gabel et al. | |
| 2016/0063416 A1 | 3/2016 | Sharma | |
| 2017/0192953 A1 | 7/2017 | Miklos et al. | |
| 2017/0308517 A1 * | 10/2017 | Josifovski | G06F 17/30699 |

OTHER PUBLICATIONS

Kulkarni, A., & Pedersen, T. (Dec. 2005). Name Discrimination and Email Clustering using Unsupervised Clustering and Labeling of Similar Contexts. In IICAI (pp. 703-722).

Sneiders, E. (2010). Automated email answering by text pattern matching. In Advances in Natural Language Processing (pp. 381-392). Springer Berlin Heidelberg.

Malik, R., Subramaniam, L. V., & Kaushik, S. (Jan. 2007). Automatically Selecting Answer Templates to Respond to Customer Emails. In IJCAI (vol. 7, pp. 1659-1664).

Marom, Y., & Zukerman, I. (Jan. 2007). A Predictive Approach to Help-Desk Response Generation. In IJCAI (pp. 1665-1670).

Traum, et al. (Jan. 2007). 5th IJCAI Workshop on Knowledge and Reasoning in Practical Dialogue Systems; Hyderabad, India; 67 pages.

Disclosed Anonymously "AutoCompletion of email addresses using context in mail client", ip.com Journal, ip.com Inc., West Henrietta, NY, US, Jun. 12, 2013; 3 pages.

International Search Report and Written Opinion of PCT Ser. No. PCT/US16/68364 dated Apr. 3, 2017.

* cited by examiner

GENERATING AND APPLYING OUTGOING COMMUNICATION TEMPLATES

BACKGROUND

Emails and similar communications sent by one or more users may follow various patterns. For example, under particular circumstances, a user or group of users may tend to draft and send emails sharing particular attributes. Suppose users within a particular department are required to draft and send reports by a particular deadline. Such outgoing communications likely will conform at least to some extent to one or more patterns. For example, the outgoing communications may share a number of textual segments that may be considered "boilerplate" or "fixed," while other textual segments may differ between communications and thus may be considered "transient" or "variable."

SUMMARY

The present disclosure is generally directed to methods, apparatus and computer-readable media (transitory and non-transitory) for analyzing a corpus of outgoing communications such as emails, transcribed voicemails, letters, etc., to generate one or more templates that are usable to automatically populate at least a portion of one or more subsequent outgoing communications. A corpus of outgoing communications may first be grouped into clusters of communications that share various shared contextual, syntactic, and/or semantic attributes, such as a user context at the times they were drafted/sent. Then, a template may be generated for each cluster. Confidential information (e.g., information that could be used to identify someone) such as a recipient's name, address, credit card number, and so forth, may be ignored, discarded, scrambled or otherwise concealed.

Generated outgoing communication templates may be usable to automatically populate at least portions of subsequent outgoing communications before and/or as those subsequent outgoing communications are being drafted or otherwise prepared. For example, as a user drafts an outgoing email, the text she types may be continuously and/or periodically compared to one or more outgoing communication templates to determine a best match. The outgoing communication template considered to best match the thus-far typed text may be used to autocomplete at least some of the user's email, to suggest possible autocompletions (e.g., as a pulldown and/or pop-up menu), to provide "fillable fields," and so forth. In some implementations, subsequent outgoing communications may be analyzed using the same technique as was used to initially group the corpus of outgoing communications into clusters. The cluster to which a subsequent outgoing communication is matched may dictate which outgoing communication template that is used to attempt to autocomplete that outgoing communication.

In some implementations, a computer implemented method may be provided that includes the steps of: grouping a corpus of outgoing communications sent by a user using one or more computing devices into a plurality of clusters, wherein each outgoing communication of the corpus is grouped into a cluster based on one or more attributes of a context of the user; classifying one or more segments of each outgoing communication of a particular cluster as fixed in response to a determination that a count of occurrences of the one or more segments across the particular cluster satisfies a criterion; classifying one or more remaining segments of each communication of the particular cluster as transient; and generating, based on sequences of classified segments associated with each communication of the particular cluster, an outgoing communication template that is usable to automatically populate at least a portion of one or more draft outgoing communications being prepared by the user with a computing device.

This method and other implementations of technology disclosed herein may each optionally include one or more of the following features.

In some implementations, the corpus may include outgoing communications sent by one or more additional users, and each outgoing communication of the corpus may be grouped into a cluster based on one or more attributes of a context of a user that sent the outgoing communication. In some implementations, each outgoing communication of the corpus may be grouped into a cluster based on one or more attributes of a context of the user at a time when the outgoing communication was sent.

In some implementations, the method may further include: selecting a particular outgoing communication template from a plurality of outgoing communication templates; and applying the particular outgoing communication template to automatically populate at least a portion of a draft outgoing communication being prepared by the user. In some implementations, the selecting may include selecting the particular outgoing communication template from the plurality of outgoing communication templates based on a measure of similarity between the particular outgoing communication template and the draft outgoing communication being prepared by the user. In some implementations, the selecting may include selecting the particular outgoing communication template from the plurality of outgoing communication templates based on one or more aspects of the user's context contemporaneous with preparing the draft outgoing communication.

In some implementations, the one or more attributes of the context of the user include a relationship between the user and a recipient of the outgoing communication. In some implementations, the one or more attributes of the context of the user include geographic coordinates of the user sensed by a mobile computing device operated by the user to send the outgoing communication. In some implementations, the one or more attributes of the context of the user include one or entries of an electronic calendar of the user. In some implementations, the one or more attributes of the context of the user include a social networking status of the user. In some implementations, the corpus of outgoing communications includes a corpus of emails sent by the user.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
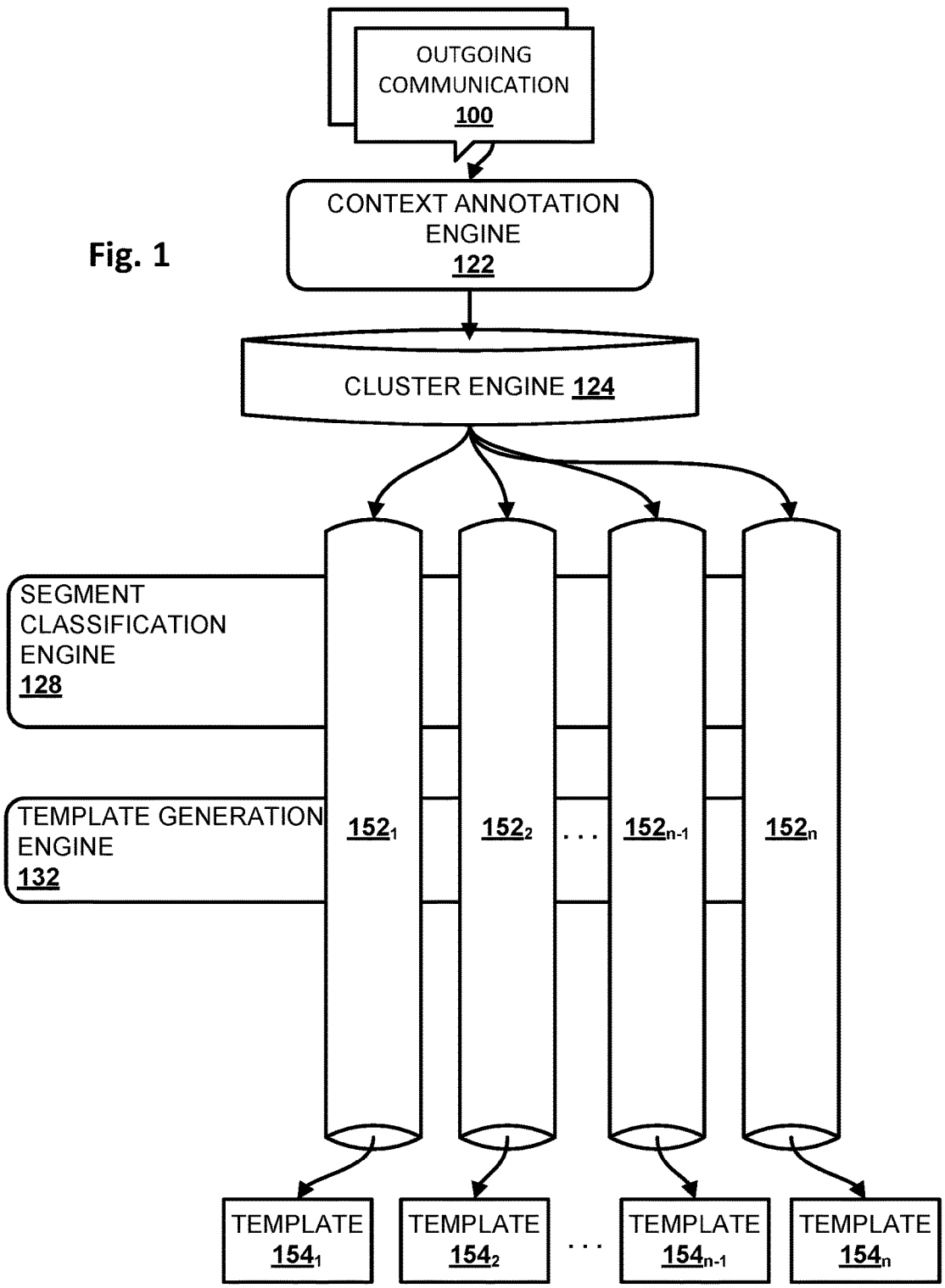
FIG. 1 illustrates an example environment in which a corpus of outgoing communications may be analyzed by various components of the present disclosure to generate one or more outgoing communication templates, in accordance with various implementations.

FIG. 1 illustrates an example environment in which a corpus of outgoing communications 100 may be grouped into clusters $152_{1-n}$, and in which clusters $152_{1-n}$ of outgoing communications may be analyzed to generate outgoing communication templates $154_{1-n}$. As used herein, an "outgoing communication" may refer to an email (e.g., text/plain), a text message (e.g., SMS, MMS), an instant message, a letter, a social media message, a dictated voice message, or any other outgoing communication that tends to conform to some sort of pattern.

In some implementations, a context annotation engine 122 may be configured to identify one or more contextual attributes of users who sent the outgoing communications 100, e.g., at the time the users sent the communications 100 and/or at a time that is contemporaneous with the users sending the communications (e.g., as part of a daily routine performed by an employee). Context annotation engine 122 may identify these contextual attributes in various ways. For example, emails may include various metadata such as one or more sender identifiers (e.g., sender email addresses), one or more recipient identifiers (e.g., recipient email addresses, including cc'd and bcc'd recipients), a date sent, a time sent, one or more attachments, a subject, and so forth. Context annotation engine 122 may analyze metadata of outgoing communications 100 to determine one or more attributes of contexts of users who sent the communications. Other contextual attributes of users may include, for instance, geographic locations of users while preparing/sending outgoing communications, time of day when preparing/sending outgoing communications, social networking statuses, and so forth.

In some implementations, one or more contextual attributes may additionally or alternatively be determined from an incoming communication to which the outgoing communication is meant to reply. For example, suppose the incoming communication makes a particular request, or is from a particular requesting party (e.g., an auditor, an attorney, etc.). Those pieces of information may be taken into consideration as attributes of the responding user's context.

In some implementations, context annotation engine 122 may identify attributes of user contexts from sources other than the outgoing communications themselves. For example, context annotation engine 122 may be in communication with one or more servers (not depicted) that facilitate transmission of outgoing communications, such as one or more email servers. Context annotation engine 122 may request information about a user's context when sending a particular outgoing communication 100 from such servers, e.g., at the time context annotation engine 122 is analyzing the outgoing communication 100. Additionally or alternatively, context annotation engine 122 may be in communication with individual client devices (not depicted) operated by users to send outgoing communications 100. These individual client devices may, for instance, store a "snapshot" of the sending user's context to be made available to context annotation engine 122 on demand. In some implementations, individual client devices may be configured (e.g., via a plugin) to incorporate user context information into outgoing communications 100 when those communications are sent, so that context annotation engine 122 may identify those attributes when performing its analysis.

In some implementations, a cluster engine 124 may be configured to group the corpus of annotated outgoing communications 100 into a plurality of clusters $152_{1-n}$ based on one or more attributes shared among contexts of users who sent one or more outgoing communications 100 within the corpus. In some implementations, cluster engine 124 may have one or more preliminary filtering mechanisms to discard outgoing communications that are not suitable for template generation. For example, if a corpus of outgoing communications 100 under analysis includes emails that are not similar contextually and/or syntactically/semantically to any other emails and thus are not suitable for clustering, those emails may be discarded.

Cluster engine 124 may additionally or alternatively utilize various attributes of outgoing communications 100 to group outgoing communications 100 into clusters, such as metadata similarity, textual similarities, byte similarities, shared patterns, and so forth. For example, in some implementations, outgoing communications such as emails may be clustered additionally or alternatively based on textual similarities. For example, emails may be analyzed to determine shared terms, phrases, n-grams, n-grams plus frequencies, and so forth. Based on these data points, emails may be clustered. For example, emails sharing a particular number of shared phrases and n-grams may be clustered together. In some implementations, emails may even be grouped into clusters based on byte similarity. For instance, emails may be viewed as strings of bytes that may include one or both of metadata and textual content. In yet other implementations, outgoing communications may be grouped together based on edit distances between them satisfying one or more thresholds (e.g., if less than n words have to be changed to match two outgoing communications, those two outgoing communications may be grouped into a cluster). In some implementations, a weighted combination of two or more of the above-described techniques may be used as well.

Once a corpus of outgoing communications 100 are grouped into clusters $152_{1-n}$, each cluster 152 may contain outgoing communications that are highly likely to include the same or similar fixed content (e.g., boilerplate), and to have transient content in approximately the same locations, e.g., spatially and/or relative to fixed segments. A segment classification engine 128 and template generation engine 132 may then perform various downstream processing to generate outgoing communication templates $154_{1-n}$ for clusters $152_{1-n}$.

Segment classification engine 128 may be configured to selectively classify segments of outgoing communications as fixed or transient using various criteria and/or techniques. In some implementations, segment classification engine 128 may store segments of a particular cluster it classifies as fixed in a dictionary or vocabulary it generates for that cluster (e.g., as a "bag of words or phrases"). In some implementations, segment classification engine 128 may employ shingling, e.g., to find the longest runs of fixed text in plain text communications of a cluster. In some implementations, segment classification engine 128 may employ tokenization to further analyze undecided segments. In some implementations, segment classification engine 128 may classify a particular segment as fixed in response to a determination, e.g., by segment classification engine 128, that a particular criterion has been satisfied. Various criteria may be used to determine that a particular segment of text is fixed.

One criterion that may be used by segment classification engine 128 to determine whether segments of text are fixed is a threshold. For instance, if a count of occurrences of a segment of text across a particular cluster satisfies a particular threshold number of outgoing communications or a percentage, it may be considered fixed. Suppose a particular segment of text such as "I have looked into your file . . . " or "Thank you for your inquiry . . . " is shared among a large number of emails in a cluster (or even among all emails). That segment of text is likely boilerplate. Segment classification engine 128 may classify that segment of text as "fixed."

In some implementations, fixed phrases may be identified in a cluster of outgoing communications using one or more variations of a so-called "suffix array." In some implementations, a set of outgoing communications such as those grouped into a particular cluster may be provided as input, along with a suffix array (e.g., a lexicographically sorted array of all suffixes of an outgoing communication) and/or a longest common prefix. A suffix-array-based algorithm may include a loop that iterates over the suffixes in the suffix array to determine, at each step, whether the suffix under examination satisfies a minimum length threshold, and whether the suffix occurs at a frequency among outgoing communications of the cluster that satisfies a frequency threshold. In some implementations, words may be considered in addition to or instead of letters. In some such implementations, the algorithm may check whether the prefix starts with a real word (e.g., is it preceded by a whitespace?), contains at least one word, and/or whether the prefix occurred in a distinct outgoing communication. The output of various suffix-array-based algorithms may be, for example, a map (e.g., <phrase, document count>) of phrases, subphrases of those phrases, and so forth. That output may be analyzed, e.g., by segment classification engine 128, to identify fixed and/or transient segments.

In various implementations, segment classification engine 128 may classify remaining segments of text that do not satisfy various fixed text criteria such as those described above as "transient." In some implementations, the output of segment classification engine 128 is one or more sequences of classified (e.g., "fixed" or "transient") segments of text.

Template generation engine 132 may be configured to generate, based on sequences of classified segments associated with each communication of the particular cluster that are provided by segment classification engine 128, outgoing communication templates $154_{1-n}$. Those outgoing communication templates 154 may be usable to automatically populate at least a portion of one or more subsequent outgoing communications.

Operations performed by cluster engine 124, segment classification engine 128, and/or template generation engine 132 may be performed on individual computer systems, distributed across multiple computer systems, or any combination of the two. These one or more computer systems may be in communication with each other and other computer systems over one or more networks (not depicted).

Figure 2:
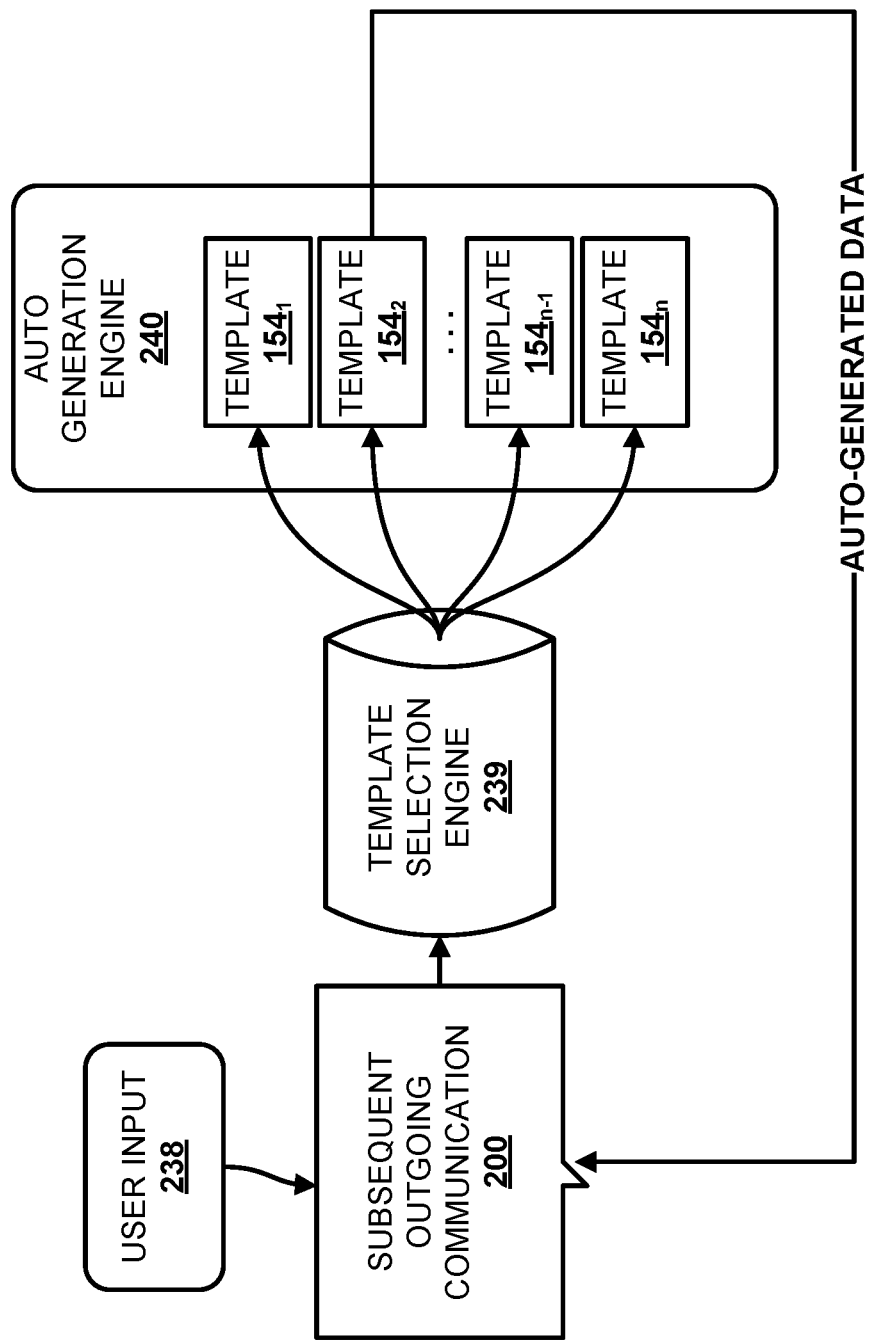
FIG. 2 depicts how generated outgoing communication templates may be applied to subsequent outgoing communications, in accordance with various implementations.

FIG. 2 depicts an example of how a subsequent outgoing communication 200 undergoing preparation based at least partially on received user input 238 may be analyzed after a plurality of outgoing communication templates $154_{1-n}$ have been generated. Various components of FIG. 2 may be implemented on a computing device operated by a user preparing to send an outgoing communication, on a remote computing system, or on any combination of the two.

In FIG. 2, a template selection engine 239 may be configured to employ various techniques to select one or more outgoing communication templates for application to outgoing communication 200. Template selection engine 239 may perform this selection at various points in time using various techniques. In some implementations, template selection engine 239 may determine the user's context at the moment the user begins preparing outgoing communication 200. In some implementations, template selection engine 239 may additionally or alternatively determine a similarity between outgoing communication 200 and templates $154_1$-$154_n$ at various points as the user types, such as after the user fills in various metadata fields (e.g., recipient, subject, attachments, etc.), after the user types sufficient message content to perform a meaningful similarity comparison between subsequent outgoing communication 200 and templates $154_1$-$154_n$, and so forth. The more often such similarity comparisons are performed, the better performance may be achieved by having one or more components of FIG. 2 operating locally, e.g., on a computing device being operated by the user to draft outgoing communication 200.

Based on the decision of template selection engine 239, an auto generation engine 240 may select and apply an outgoing communication template (e.g., one of $154_{1-n}$) to auto generate data to be used to populate appropriate portions of outgoing communication 200. For example, in this example, auto generation engine 240 has selected template $154_2$ as the best match to outgoing communication 200, and has provided data it automatically generated using template $154_2$ for use in automatically populating portions of outgoing communication 200.

Figure 3:
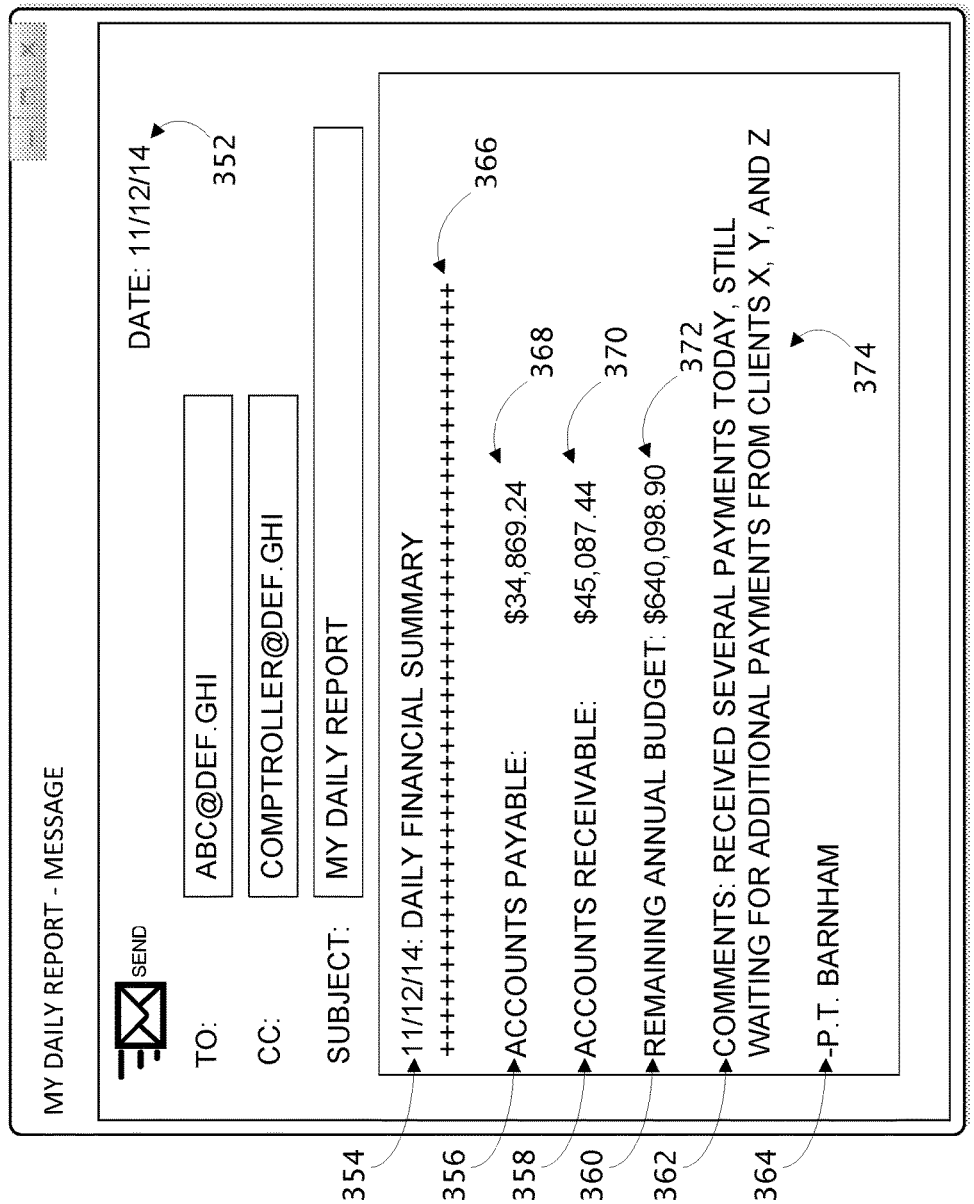
FIG. 3 depicts on example of an outgoing communication that may be used to create an outgoing communication template, in accordance with various implementations.

FIG. 3 depicts a hypothetical outgoing communication in the form of an email 300 that may be grouped into a cluster with other similar emails, which then collectively may be used to generate outgoing communication templates, in accordance with various implementations. Email 300 includes various metadata, visible examples of which include a recipient email address ("ABC@DEF.GHI"), a carbon copied address ("COMPTROLLER@DEF.GHI"), a date sent 352 (Nov. 12, 2014), and a subject ("MY DAILY REPORT").

Suppose that the sender of email 300 prepares and sends a similarly-structured email to the same recipients under a similar context each day (e.g., at or near the same time of day, in response to an incoming communication that matches a pattern, etc.). Those sent emails (which may be stored, for instance, in the user's sent mail folder and/or in a recipients mailbox) may be clustered together based on various signals, such as one attributes of the sending user's context when he or she sent them, on textual similarity between email 300 and other similar emails, and so forth. Textual similarity between emails may be determined using the raw text of emails, reduced-dimensionality feature sets created using emails (e.g., "bags of words") and various related statistics (e.g., term frequency—inverse document frequency), and so forth. Various techniques may be deployed to determine similarity between emails, including but not limited to cosine similarity and/or Kullback-Leibler divergence.

Once email 300 and other similar emails are grouped into a cluster, segments of text in email 300 and other emails of the cluster that satisfy various criteria, such as a frequency threshold, may be classified (e.g., by segment classification engine 128) as fixed. Segments of text that do not satisfy such thresholds, or that satisfy other thresholds associated with transient content, may be classified (e.g., by segment classification engine 128) as transient. In email 300, for instance, many of the segments of text may be repeated across similar emails the sender frequently sends under similar circumstances (i.e. in the same or similar context), and thus may be classified as fixed. For example, segments 354-366 may all tend to be segments that do not change much across emails. Some of these segments may be entirely static, such as the labels "ACCOUNTS PAYABLE" (356), "ACCOUNTS RECEIVABLE" (358), "REMAINING ANNUAL BUDGET" (360), "COMMENTS" (362), and text 366 added by the sender to incorporate delineating visual structure to email 300, which in this example is a series of "+" signs. Other segments may not necessarily be static but may be directly tied to various aspects of email 300. For example, the date 354 at the top of the report may always be the same as the date 352 on which email 300 was drafted and/or sent. Similarly, the signature 364 may always be the same as the name of the sender or to some predefined signature block selected by the sender or the sender's employer.

Other segments of text may not necessarily be repeated across email 300 and other emails of the cluster. These less repetitive segments may constitute transient content that may not be as useful when attempting to automatically populate at least a portion of a subsequent outgoing communication. For example, segments 368-374 may include unique information such as a current value of an accounts payable (368) or receivable (370), a current budget (372), or even user-drafted comments (374). These transient segments of text may be classified as transient, e.g., by segment classification engine 128.

Once segments of email 300 and other emails in the same cluster are classified, an outgoing communication template may be generated, e.g., by template generation engine 132, for that cluster using various combinations of the techniques described above. Content classified as transient that is unlikely shared among more than a few emails of the cluster may be discarded or otherwise disregarded. For example, segments (368 and 370) following the "ACCOUNTS PAYABLE:" and "ACCOUNTS RECEIVABLE:" segments may be considered transient because it is unlikely that more than a small fraction of the emails in the cluster will contain the exact same text associated with these segments of text. The same goes for other pieces of information, like the typed comments after the fixed text "COMMENTS:". On the other hand, fixed content, such as 354-366, may be added to the outgoing communication template.

When the sender of email 300 (or another sender having a similar context) later sets out to type and send an email that is sufficiently similar to email 300 and other emails of the cluster, that subsequent email may automatically be at least partially populated. An example of this is depicted in FIGS. 4A-B, with similar elements numbered similarly as in FIG. 3 except beginning with a "4" instead of a "3".

Figure 4A:
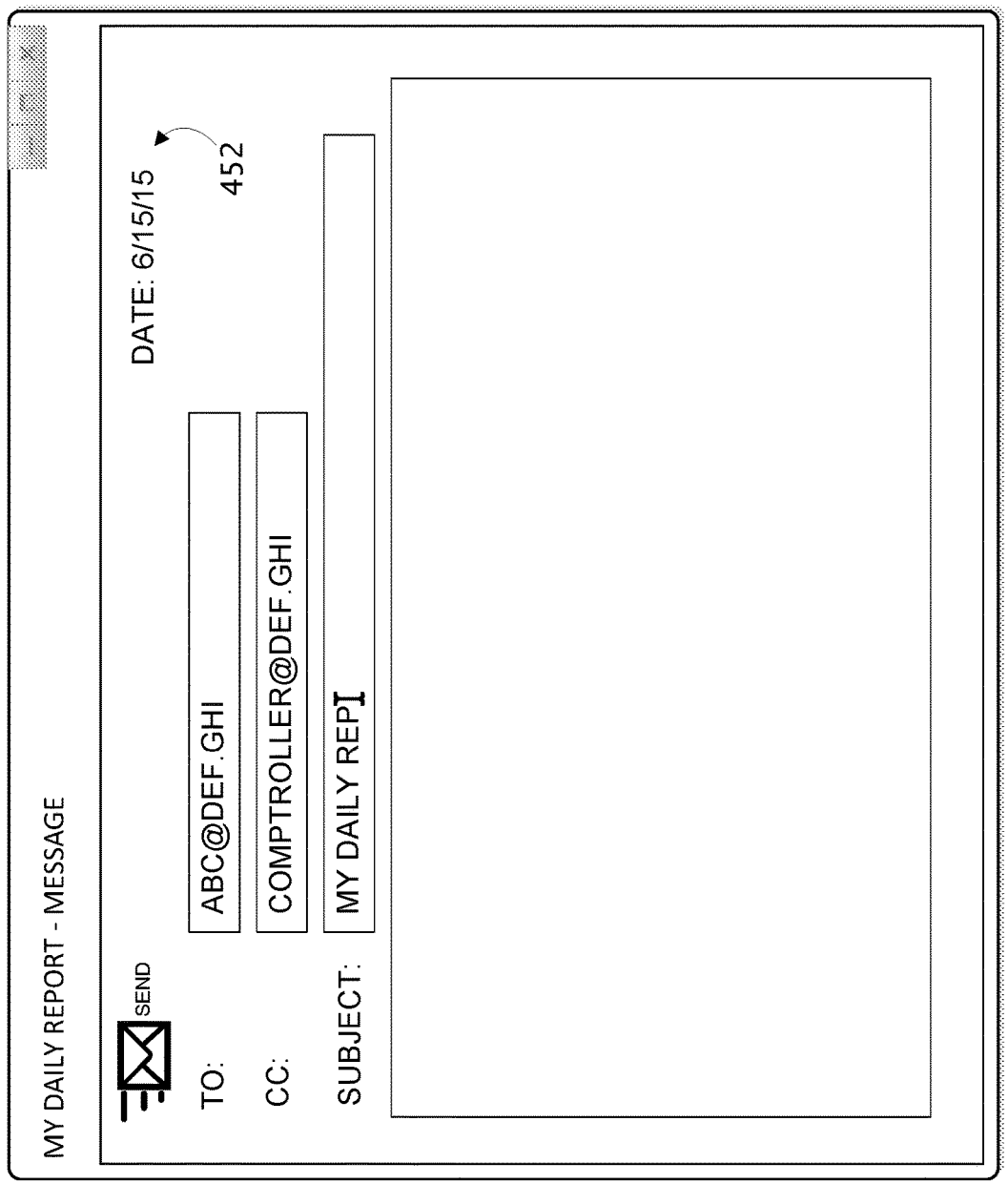
FIGS. 4A and 4B illustrates an example of how an outgoing communication template generated using outgoing communications like that of FIG. 3 may later be applied to automatically populate at least a portion of a subsequent outgoing communication, in accordance with various implementations.
Figure 4B:
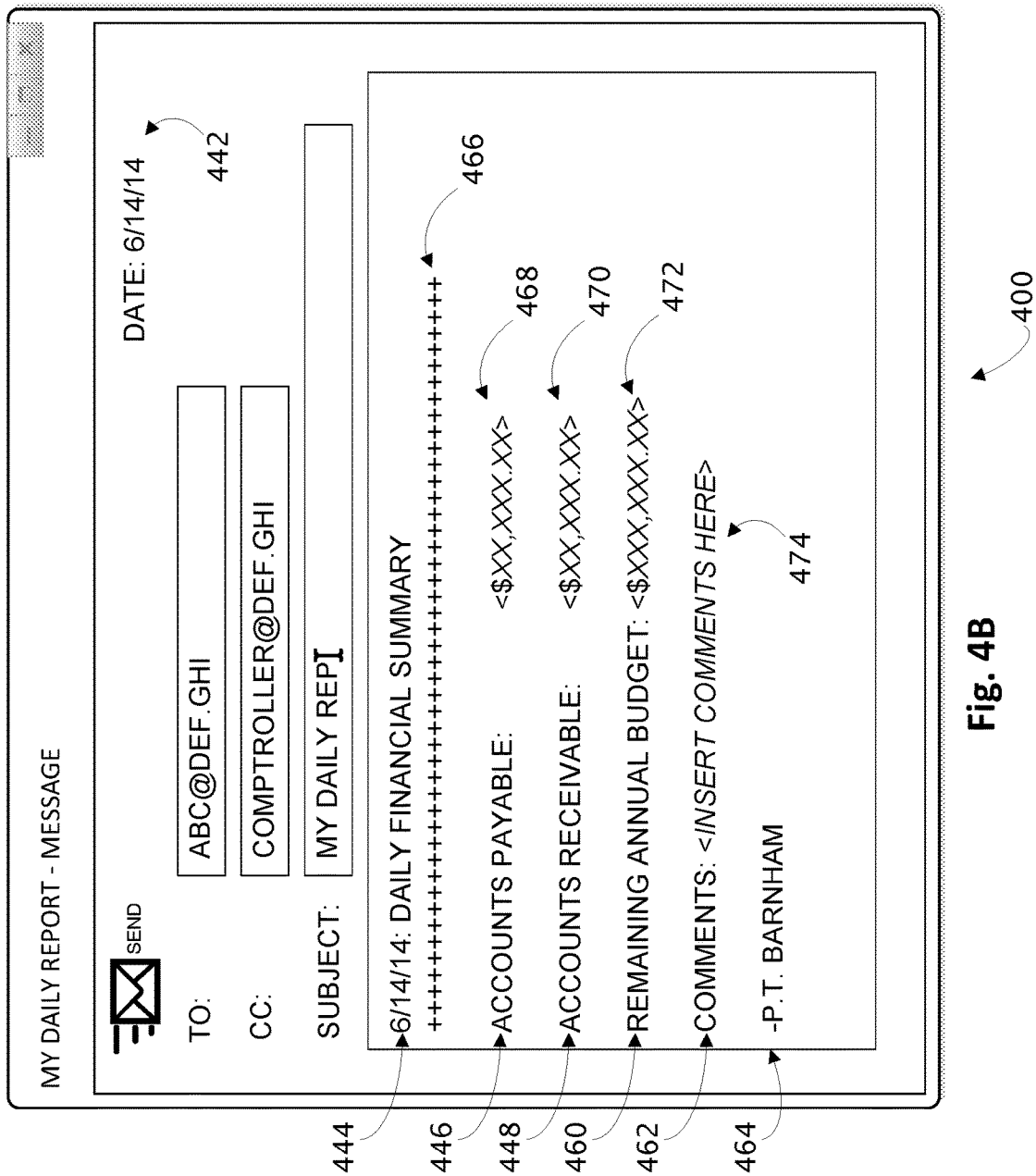

In FIG. 4A, an outgoing email 400 is being drafted, e.g., by the same user that sent email 300 or a different user having a similar context (e.g., under similar circumstances). In this example, the sender had gotten as far as typing the recipient (ABC@DEF.GHI) and the cc recipient (COMPTROLLER@DEF.GHI), and is in the midst of typing the subject ("MY DAILY REP|"). At this point, a component such as template selection engine 239 and/or auto generation engine 240 may determine that content of email 400 and/or the context in which email 400 is being drafted is sufficiently similar to that of email 300 that the outgoing communication template should be applied to populate the remainder of email 400.

When that happens, an outgoing communication template may be selected and applied to automatically populate one or more portions of email 400. For example, in FIG. 4B, the entire message of the email has been populated with either segments of text classified as fixed as described above (e.g., segments 444-466), or fillable placeholders for segments deemed transient (e.g., segments 468-474). In other implementations, more or less of a message may be auto-populated. For example, in some implementations, shorter snippets of text may be populated in front of the location at which the user is currently inputting text (e.g., as auto-completions and/or as options in a pull down (also referred to as a "drop down") menu). One or more graphical elements, such as one or more drop down menu selectable options, may appear that enable the user to select, accept, and/or reject the auto-populated text as it appears. While examples described herein have included fillable fields, this is not required. In some implementations, an outgoing communication template may include only fixed text, and may populate subsequent outgoing communications only with that fixed text.

In some implementations, different outgoing communication templates may be selected and/or applied as the user provides more input text. For example, outgoing templates may be re-checked after every keystroke, after input of each word, after each sentence, every few seconds, etc., to determine whether, given the text provided by the user, there is a "better-matching" outgoing communication template. The more frequently comparisons are made between the thus-far input text and outgoing communication templates, the more beneficial it may be to host the templates and/or the processes/engines that apply them locally on a computing device that is used by the user to prepare email 400. This may, for example, reduce lag and/or latency.

Figure 5:
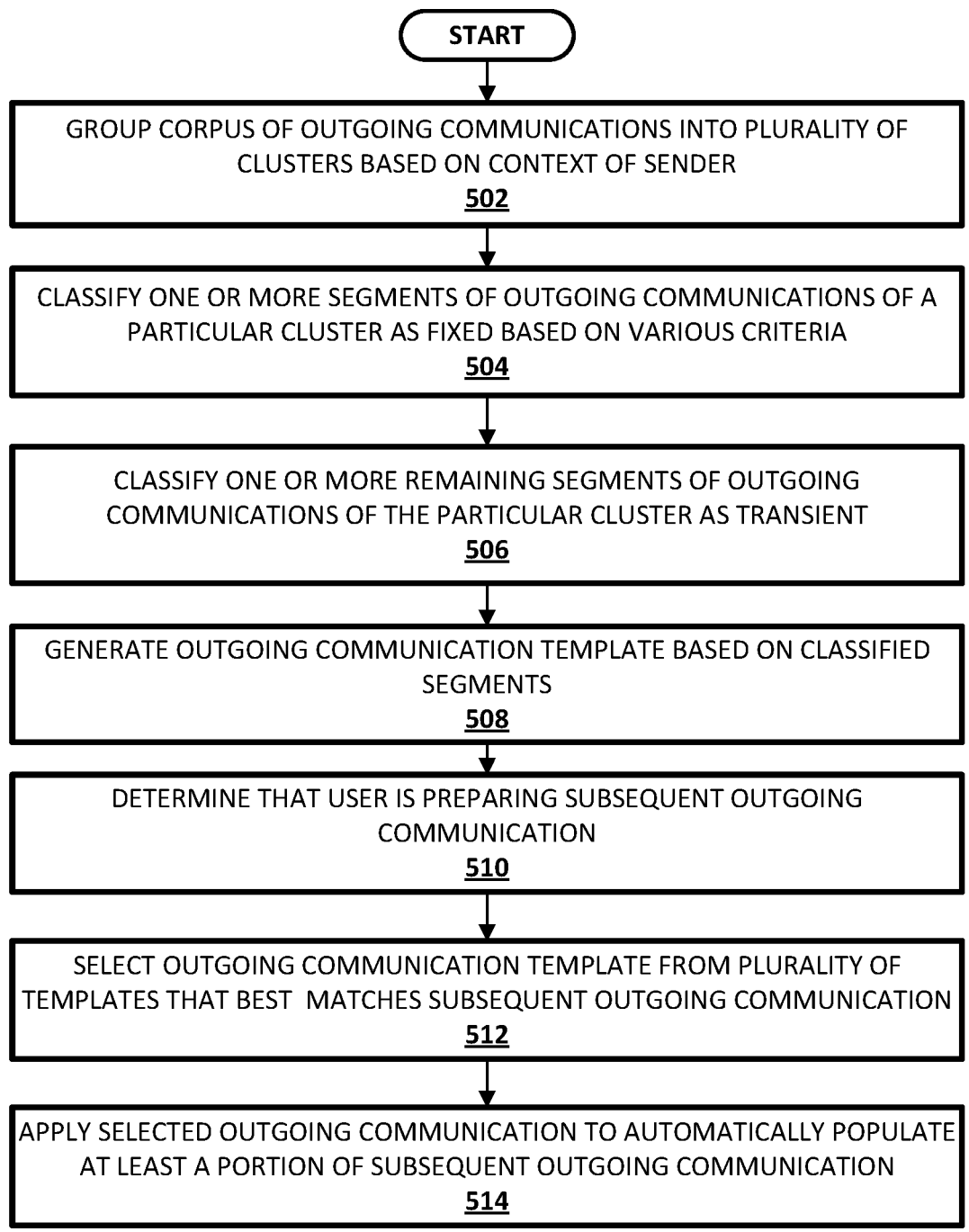
FIG. 5 depicts a flow chart illustrating an example method of generating and applying outgoing communication templates.

Referring now to FIG. 5, an example method 500 of clustering outgoing communications and generating outgoing communication templates is described. For convenience, the operations of the flow chart are described with reference to a system that performs the operations. This system may include various components of various computer systems. Moreover, while operations of method 500 are shown in a particular order, this is not meant to be limiting. One or more operations may be reordered, omitted or added.

At block 502, the system may group a corpus of outgoing communications (e.g., emails in a user's sent email folder, emails in a group of users' sent email folders, etc.) into a plurality of clusters. Each outgoing communication may be grouped into a cluster based at least in part on one or more contextual attributes of the sender that sent the communication, e.g., at the time the outgoing communication was sent or contemporaneously with preparation and sending of that communication. Additionally or alternatively, one or more attributes of the communications themselves, such as their metadata, content (e.g., textual, html) similarity to other communications, etc., may be used to group the communications into clusters.

As noted above, various attributes of a user's context may be considered when grouping a communication into a cluster. In some implementations, a relationship between the user and a recipient of the outgoing communication may be considered. For example, if the recipient has a particular title or rank, and that title or rank places the sender above or below the recipient in a hierarchy, that relationship may weigh in favor of grouping the communication into a particular cluster of communications, e.g., from similarly-ranked/titled senders to similarly-ranked/titled recipients.

As another example, geographic coordinates of the user, e.g., sensed by a mobile computing device operated by the user to send the outgoing communication, may be considered when clustering the outgoing communication. Suppose the sender is located at a particular worksite (e.g., a construction site, client place of business, disaster zone, battlefield, etc.). The sender's geographic coordinates may be used, e.g., in tandem with information about the sender's task while at the worksite (e.g., to provide a particular type of report), to group the communication into a cluster with other outgoing communications produced under the same or similar circumstances/contexts.

In some implementations, one or more entries of an electronic calendar of the sender may be used, alone or in tandem with other contextual attributes described herein, to group one or more communications sent by the sender into a particular cluster. Suppose the sender's calendar indicates that the sender is scheduled to be engaged in a particular activity at regularly scheduled time intervals. Suppose further that while engaged in the activity, the sender tends to send emails having very similar structure (e.g., the same or similar fixed content). Emails created and/or sent by the sender during the time intervals indicated by the sender's calendar may be grouped into a cluster.

In some implementations, a social networking status of the sender may be used, alone or in tandem with other contextual attributes described herein, to group one or more communications sent by the sender into a particular cluster. For example, suppose the sender's status is, for a time, "hunkered down getting out tax reports." Emails sent by the sender while the user's social media status is set to "hunkered down getting out tax reports" that also satisfy a particular similarity threshold may be grouped into a cluster. However, emails sent by the sender while his or her social media status is set differently may be required to satisfy a different, e.g., higher, similarity threshold.

In some implementations, and as alluded to above, in addition to or instead of being grouped into clusters based on sender contextual attributes, outgoing communications may be grouped into clusters based on one or more attributes of a recipient's context. These recipient contextual attributes may include any of those contextual attributes mentioned above, such as recipient's location when message received and/or opened, recipient's status when received and/or opened, recipient's title, etc.).

Once the outgoing communications of the corpus are grouped into clusters, at block 504, the system may classify one or more segments of each outgoing communication of a particular cluster as fixed. Example criteria for classifying a segment of text as fixed are described above. At block 506, the system may classify remaining unclassified segments of each outgoing communication of the particular cluster as transient.

At block 508, the system may generate, e.g., for each cluster into which outgoing communications were grouped at block 502, an outgoing communication template. The outgoing communication template may be generated based at least in part on the segments classified at block 504 and/or 506. Outgoing communication templates may come in various forms. For example, in some implementations, they may include fixed text segments and then various types of wildcards (e.g., regular expressions) in the place of segments that were classified transient. The wildcards may, for instance, be manifested in a user interface of a user in the form of a fillable field, similar to 468-474 in FIG. 4B.

At some point after one or more outgoing communications are generated at block 508, the system may determine that it is time to apply one or more outgoing communication templates. For example, in some implementations, a user may receive a communication such as an email that conforms to a particular pattern, and a draft response may be automatically populated using one or more templates. Additionally or alternatively, and as is depicted in FIG. 5, the system may determine at block 510 that a user is preparing a subsequent outgoing communication using a computing device. For example, the user may have operated a smart phone to open a graphical user interface that facilitates drafting of a new email or text message. Or, the user may have initiated dictation software to draft new outgoing correspondence.

However the system determines that it is time to automatically populate at least a portion of an outgoing message, at block 512, the system may select an outgoing communication template that best matches the subsequent outgoing communication being drafted and/or the context of the user that is drafting it. For example, suppose the user is on his or her way home from work and begins dictating a text message "On my way home . . . want|". The system may recognize that the user's context indicates that the user is at the end of his or her shift, that the user has boarded public transportation or has begun travelling from work towards home in an automobile, etc. The system may then compare content of a subset of one or more outgoing communication templates that match that context (i.e., were created using outgoing communications the user prepared and sent under similar circumstances) with content thus far prepared in the subsequent outgoing communication. Whichever outgoing communication template of the subset is most similar to the outgoing communication currently being prepared may be selected as the "best match."

At block 514, the system may apply the selected outgoing communication template to automatically populate at least a portion of the user's outgoing communication. In the example above, for instance, an outgoing template may be applied to automatically complete the user's outgoing message as follows: "On my way home . . . want me to stop at the store to pick up baby formula?"

Figure 6:
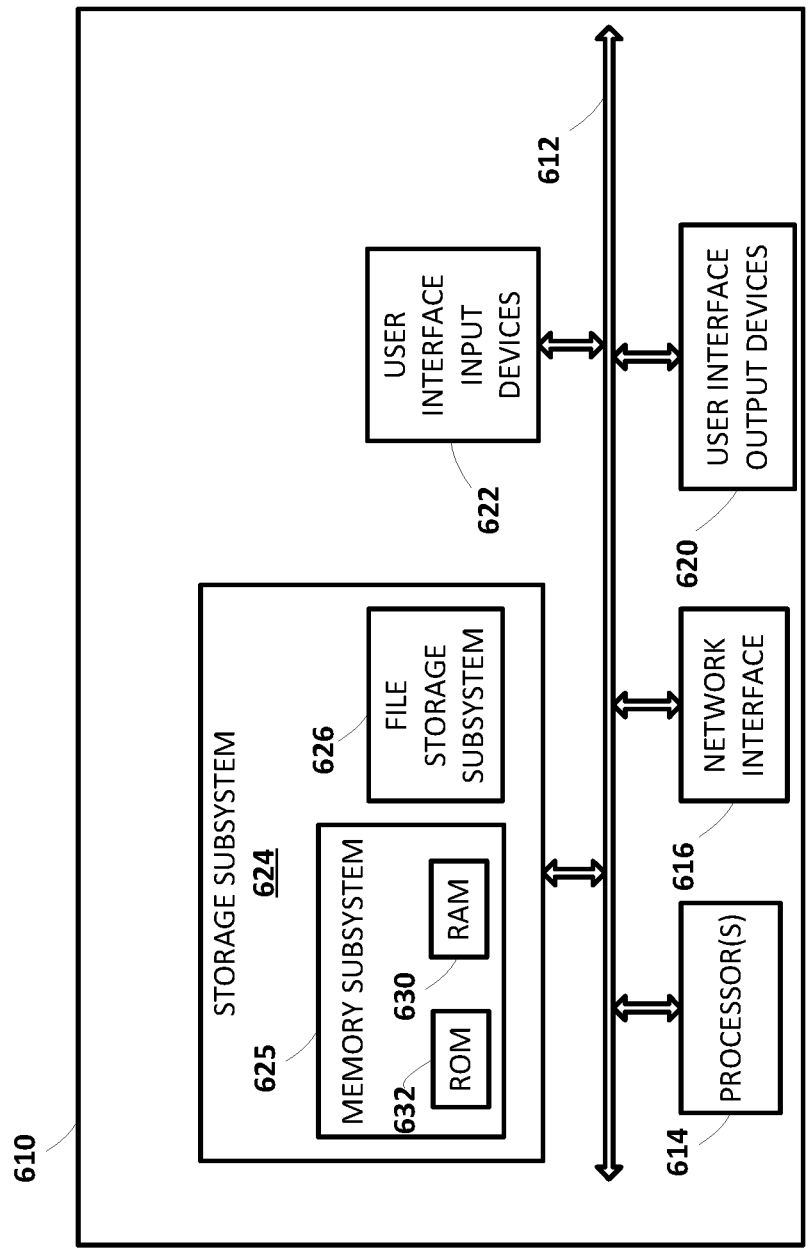
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 500 and/or to implement one or more of cluster engine 124, segment classification engine 128, template generation engine 132, template selection engine 239, and/or auto generation engine 240.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented on one or more processors, comprising:

grouping a corpus of outgoing communications into a plurality of clusters, wherein each outgoing communication of the corpus is grouped into a cluster based on geographic coordinates sensed by a respective mobile computing device operated by a corresponding recipient to which the outgoing communication was sent;

classifying one or more segments of each of a plurality of the outgoing communications of a particular cluster as fixed in response to a determination that a count of occurrences of the one or more segments across the particular cluster satisfies a criterion;

classifying one or more remaining segments of each of the plurality of the outgoing communications of the particular cluster as transient;

generating, based on sequences of classified segments associated with each of the plurality of the outgoing communications of the particular cluster, an outgoing communication template that is usable to automatically populate at least a portion of one or more draft outgoing communications;

determining, based on one or more interactions between a user and a computing device operated by the user, that the user is preparing a subsequent outgoing communication to a particular recipient;

selecting a particular outgoing communication template from a plurality of outgoing communication templates, wherein the selecting is based on geographic coordinates sensed by another mobile computing device operated by the particular recipient of the subsequent outgoing communication; and applying the particular outgoing communication template to automatically populate at least a portion of the subsequent outgoing communication being prepared by the user with content from the particular outgoing communication template.

2. The method of claim 1, wherein the selecting is further based on a measure of similarity between the particular outgoing communication template and the subsequent outgoing communication being prepared by the user.

3. The method of claim 1, further comprising selecting the particular communication template from the plurality of outgoing communication templates further based on one or more aspects of the user's context contemporaneous with preparing the subsequent outgoing communication.

4. The method of claim 1, wherein automatically populating at least a portion of the subsequent outgoing communication comprises providing a drop down menu with one or more selectable options, wherein each of the one or more selectable options includes text from the particular outgoing communication template.

5. At least one non-transitory computer-readable medium comprising instructions that, in response to execution of the instructions by one or more processors, cause the one or more processors to perform the following operations:
grouping a corpus of outgoing communications sent by a user into a plurality of clusters, wherein each outgoing communication of the corpus is grouped into a cluster based on geographic coordinates sensed by a respective mobile computing device operated by a corresponding recipient to which the outgoing communication was sent;
classifying one or more segments of each communication of a particular cluster as fixed in response to a determination that a count of occurrences of the one or more segments across the particular cluster satisfies a criterion;
classifying one or more remaining segments of each communication of the particular cluster as transient;
generating, based on sequences of classified segments associated with each communication of the particular cluster, an outgoing communication template that is usable to automatically populate at least a portion of one or more draft outgoing communications;
determining, based on one or more interactions between the user and a computing device operated by the user, that the user is preparing a subsequent outgoing communication to a particular recipient;
selecting a particular outgoing communication template from a plurality of outgoing communication templates, wherein the selecting is based on geographic coordinates sensed by another mobile computing device operated by the particular recipient of the subsequent outgoing communication; and
applying the particular outgoing communication template to automatically populate at least a portion of the subsequent outgoing communication being prepared by the user with content from the particular outgoing communication template.

6. The at least one non-transitory computer-readable medium of claim 5, wherein the selecting is further based on a measure of similarity between the particular outgoing communication template and the subsequent outgoing communication being prepared by the user.

7. The at least one non-transitory computer-readable medium of claim 5, further comprising selecting the particular communication template from the plurality of outgoing communication templates further based on one or more aspects of the user's context contemporaneous with preparing the subsequent outgoing communication.

8. The at least one non-transitory computer-readable medium of claim 5, wherein automatically populating at least a portion of the subsequent outgoing communication comprises providing a drop down menu with one or more selectable options, wherein each of the one or more selectable options includes text from the particular outgoing communication template.

9. A system comprising one or more processors and memory operably coupled with the one or more processors, wherein the memory stores instructions that, in response to execution of the instructions by one or more processors, cause the one or more processors to perform the following operations:
grouping a corpus of outgoing communications sent by a user into a plurality of clusters, wherein each outgoing communication of the corpus is grouped into a cluster based on geographic coordinates sensed by a respective mobile computing device operated by a corresponding recipient to which the outgoing communication was sent;
classifying one or more segments of each communication of a particular cluster as fixed in response to a determination that a count of occurrences of the one or more segments across the particular cluster satisfies a criterion;
classifying one or more remaining segments of each communication of the particular cluster as transient;
generating, based on sequences of classified segments associated with each communication of the particular cluster, an outgoing communication template that is usable to automatically populate at least a portion of one or more draft outgoing communications;
determining, based on one or more interactions between the user and a computing device operated by the user, that the user is preparing a subsequent outgoing communication to a particular recipient;
selecting a particular outgoing communication template from a plurality of outgoing communication templates, wherein the selecting is based on geographic coordinates sensed by another mobile computing device operated by the particular recipient of the subsequent outgoing communication; and
applying the particular outgoing communication template to automatically populate at least a portion of the subsequent outgoing communication being prepared by the user with content from the particular outgoing communication template.

10. The system of claim 9, wherein the selecting is further based on a measure of similarity between the particular outgoing communication template and the subsequent outgoing communication being prepared by the user.

11. The system of claim 9, further comprising instructions to select the particular communication template from the plurality of outgoing communication templates further based on one or more aspects of the user's context contemporaneous with preparing the subsequent outgoing communication.

* * * * *